(12) United States Patent
Lim

(10) Patent No.: US 7,082,289 B2
(45) Date of Patent: Jul. 25, 2006

(54) FOLDER DRIVING DEVICE FOR PORTABLE DEVICE

(75) Inventor: Tae Hyeong Lim, Suwon-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 561 days.

(21) Appl. No.: 10/330,520

(22) Filed: Dec. 26, 2002

(65) Prior Publication Data

US 2004/0203522 A1 Oct. 14, 2004

(30) Foreign Application Priority Data

Jul. 24, 2002 (KR) .................... 10-2002-0043638

(51) Int. Cl.
*H04B 1/38* (2006.01)
(52) U.S. Cl. .............. 455/90.3; 379/433.13; 379/428.01; 379/433.11; 379/440
(58) Field of Classification Search .......... 379/433.13, 379/428.01, 433.11, 440; 455/90.3
See application file for complete search history.

(56) References Cited

U.S. PATENT DOCUMENTS

| | | | | |
|---|---|---|---|---|
| 6,115,886 A * | 9/2000 | Fujita | ................... | 16/330 |
| 6,292,980 B1 * | 9/2001 | Yi et al. | ................... | 16/303 |
| 6,295,358 B1 * | 9/2001 | Kubota | ................... | 379/433.13 |
| 6,321,415 B1 * | 11/2001 | Frohlund | ................... | 16/330 |
| 6,633,643 B1 * | 10/2003 | Ona | ................... | 379/433.13 |
| 6,751,488 B1 * | 6/2004 | Lee | ................... | 455/575.3 |
| 6,785,935 B1 * | 9/2004 | Ahn et al. | ................... | 16/221 |
| 6,885,849 B1 * | 4/2005 | Kim et al. | ................... | 455/90.3 |
| 6,925,684 B1 * | 8/2005 | Kang et al. | ................... | 16/264 |
| 6,937,876 B1 * | 8/2005 | Kim | ................... | 455/550.1 |
| 2003/0162509 A1 * | 8/2003 | Bae et al. | ................... | 455/90 |

FOREIGN PATENT DOCUMENTS

JP  2000161341 A * 6/2000

* cited by examiner

*Primary Examiner*—Lee Nguyen
*Assistant Examiner*—Sujatha Sharma
(74) *Attorney, Agent, or Firm*—Darby & Darby

(57) ABSTRACT

Disclosed is a folder driving device for a portable device. The device comprises first and second shaft support parts formed at one end of a body element of the portable device, wherein said first and second shaft support parts are spaced apart from each other by a predetermined distance and opened at their respective ends facing to each other; a cylindrical hinge housing connected to a folder of the portable device, wherein said cylindrical hinge housing is positioned between the first and second shaft support parts and opened at both ends thereof; a hinge cam coupled to the second shaft support part in the hinge housing in a manner such that it is prevented from being rotated and allowed to be moved in an axial direction; a hinge shaft placed in the hinge housing and cooperating with the hinge cam to determine folder opening and closing positions; an elastic member placed between the hinge cam and the hinge housing to apply elastic force to the hinge cam for biasing the hinge cam against the hinge shaft; and driving means for transmitting rotation force to the hinge shaft.

12 Claims, 3 Drawing Sheets

FOLDER DRIVING DEVICE FOR PORTABLE DEVICE

BACKGROUND OF THE INVENTION

1. Field of the Invention

The present invention relates to a folder type portable device, and more particularly, to a folder driving device for a portable device in which cam couplers are mounted in a hinge housing to improve assemblability and matchability of component parts.

2. Description of the Related Art

Generally, portable devices are classified, in terms of configuration, into a bar type in which number and function buttons are exposed to the outside, a flip type which has a cover for protecting number and function buttons, and a folder type which can be folded to be shortened in length to a half. As portable devices trend toward miniaturization, folder type portable devices are widely used throughout the world.

As shown in FIG. 1, a folder type portable device largely comprises a body element 10 and a folder 20. The body element 10 has number and function buttons 12 and a microphone. Various control units for enabling transmission and receipt of communication are built in the body element 10, and a battery pack is attached to a rear surface of the body element 10.

The folder 20 has a display window 22 for displaying various telephone-call information items and functional information items, and a speaker. Other various component parts are built in the folder 20.

In the folder type portable device, the folder 20 is connected to the body element 10 by hinge means that is composed of a shaft support part 16 and a hinge housing 25. By rotating the folder 20 rearward or forward about the hinge means, the folder 20 is opened and closed.

These days, in an attempt to allow the folder 20 to be more easily opened and closed, an automatically foldable portable device has been disclosed in the art. In the automatically foldable portable device, the folder 20 can be manually opened and closed, and, at the same time, when an operation button is pressed, the folder 20 can be automatically opened and closed by a motor.

Referring to FIG. 2, there is shown a cross-sectional view taken along the line A—A of FIG. 1, illustrating the conventional folder driving device for a portable device. One end of the hinge housing 25 is connected to a first shaft support part 16 of the body element 10 by the medium of a hinge shaft 30, and the other end of the hinge housing 25 is connected to a second shaft support part 15 of the body element 10 by the medium of cam couplers 35 and 36.

A motor 31 and a reducer 32 are disposed in the hinge housing 25 to provide driving force for compulsively operating the cam couplers 35 and 36 and thereby automatically opening and closing the folder 20.

The cam couplers comprise a hinge cam 36 and a hinge shaft 35. The hinge cam 36 is coupled to the second shaft support part 15 of the body element 10 in a manner such that it is prevented from being rotated and is allowed to be moved in an axial direction while being supported by an elastic member 38. The hinge shaft 35 is connected to an output end of the reducer 32 and faces the hinge cam 36 to determine folder opening and closing positions.

The unexplained reference numerals 33 and 34 represent sensor means for sensing an opened position of the folder 20. The sensor means comprise a sensing plate 33 and a sensing contactor 34 to be brought into contact with the sensing plate 33. Further, the unexplained reference numeral 37 represents a guide ring for guiding movement of the hinge cam 36.

However, the conventional folder driving device constructed as mentioned above suffers from defects in that, since the hinge cam 36 is not mounted in the hinge housing 25, the motor 31 and the hinge shaft 35 must be assembled along with the hinge cam 36 and the elastic member 38, whereby assemblability of the folder driving device is deteriorated, and it is difficult to adequately maintain gaps between component parts to be assembled.

FIG. 3 is a cross-sectional view illustrating another conventional folder driving device for a portable device. In this folder driving device, a motor 42, a gear box 43, a hinge shaft 44 and a hinge cam 45 are all disposed in a hinge housing 25.

Nevertheless, the folder driving device described just above encounters a problem in that, because the motor 42 and the gear box 43 are supported by an elastic member 41 to be moved in an axial direction, a first space which is occupied by the elastic member 41 and a second space in which the motor 42 is to be moved must be necessarily secured, whereby it is difficult to increase a size of the motor 42, and limitation cannot but be imposed to increasing a torque of the motor 42.

SUMMARY OF THE INVENTION

Accordingly, the present invention has been made in an effort to solve the problems occurring in the related art, and an object of the present invention is to provide a folder driving device for a portable device in which cam couplers and an elastic member for supporting the cam couplers are mounted in a hinge housing to improve assemblability and matchability of component parts while not causing a decrease in torque outputted from a motor.

In order to achieve the above object, according to one aspect of the present invention, there is provided a folder driving device for a portable device, comprising: first and second shaft support parts formed at one end of a body element of the portable device, wherein said first and second shaft support parts are spaced apart from each other by a predetermined distance and opened at their respective ends facing to each other; a cylindrical hinge housing connected to a folder of the portable device, wherein said cylindrical hinge housing is positioned between the first and second shaft support parts and opened at both ends thereof; a hinge cam coupled to the second shaft support part in the hinge housing in a manner such that it is prevented from being rotated and allowed to be moved in an axial direction; a hinge shaft placed in the hinge housing and cooperating with the hinge cam to determine folder opening and closing positions; an elastic member placed between the hinge cam and the hinge housing to apply elastic force to the hinge cam for biasing the hinge cam against the hinge shaft; and driving means for transmitting rotation force to the hinge shaft.

According to another aspect of the present invention, the hinge cam is integrally and projectedly formed, at its one axial end surface, with an elongate rod portion to be coupled into the second shaft support part.

According to another aspect of the present invention, the second shaft support part has a coupling groove which is defined in such a way as to allow axial movement of and prevent rotation of the rod portion inserted therein.

According to another aspect of the present invention, a spring support portion for supporting the elastic member is formed at an end of the hinge housing which faces the second shaft support part.

According to another aspect of the present invention, the spring support portion is defined, at a center thereof, with a hole through which the hinge cam passes.

According to another aspect of the present invention, the driving means comprises a motor for generating rotation force, and a reducer for reducing a rotation speed of the motor as desired and transmitting a reduced rotation speed to the hinge shaft.

According to another aspect of the present invention, a sensor for sensing a position of the folder is arranged between a portion integrally connected with the reducer and the hinge shaft.

According to another aspect of the present invention, both of the motor and the reducer are positioned in the hinge housing.

According to another aspect of the present invention, the motor is mounted in the folder, and the reducer is positioned in the hinge housing to receive rotation force from the motor via a power transmission arrangement.

According to another aspect of the present invention, there is provided a folder driving device for a portable device, comprising: first and second shaft support parts formed on a body element of the portable device; a hinge housing connected to a folder of the portable device and positioned between the first and second shaft support parts; a hinge connector adapted to connect one of the shaft support parts to the hinge housing to allow a relative rotation therebetween; a pair of cam couplers coupled to the second shaft support part in the hinge housing in a manner such that one cam coupler is pre-vented from being rotated and is allowed to be moved in an axial direction and the other cam coupler functions to determine folder opening and closing positions; driving means for providing driving force to the other cam coupler to allow the folder to be automatically opened and closed; and an elastic member placed between one cam coupler and the hinge housing to cause the cam couplers to be brought into close contact with each other to thereby be moved in the axial direction.

According to another aspect of the present invention, the driving means comprises a power generator for generating rotation force, and a reducer mounted in the hinge housing and connected to the power generator to reduce a rotation speed of the power generator as desired.

According to still another aspect of the present invention, a sensor for sensing a position of the folder is arranged between a portion integrally connected with the reducer and the other cam coupler.

According to yet still another aspect of the present invention, there is provided a folder driving device for a portable device, comprising: first and second shaft support parts formed at one end of a body element of the portable device, wherein said first and second shaft support parts are spaced apart from each other by a predetermined distance and opened at their respective ends facing to each other; a cylindrical hinge housing connected to a folder of the portable device, wherein said cylindrical hinge housing is positioned between the first and second shaft support parts and opened at both ends thereof; a pair of cam couplers respectively including a hinge cam which is coupled to the second shaft support part in a manner such that it is prevented from being rotated and is allowed to be moved in an axial direction and a hinge shaft which cooperates with the hinge cam to determine folder opening and closing positions; an elastic member for applying elastic force to the hinge cam to bring the hinge cam into close contact with the hinge shaft; and driving means including a power generator for generating rotation force, a reducer connected to the power generator to transmit rotation force to the hinge shaft and reduce a rotation speed of the power generator as desired, and a power transmission arrangement for connecting the power generator and the reducer.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
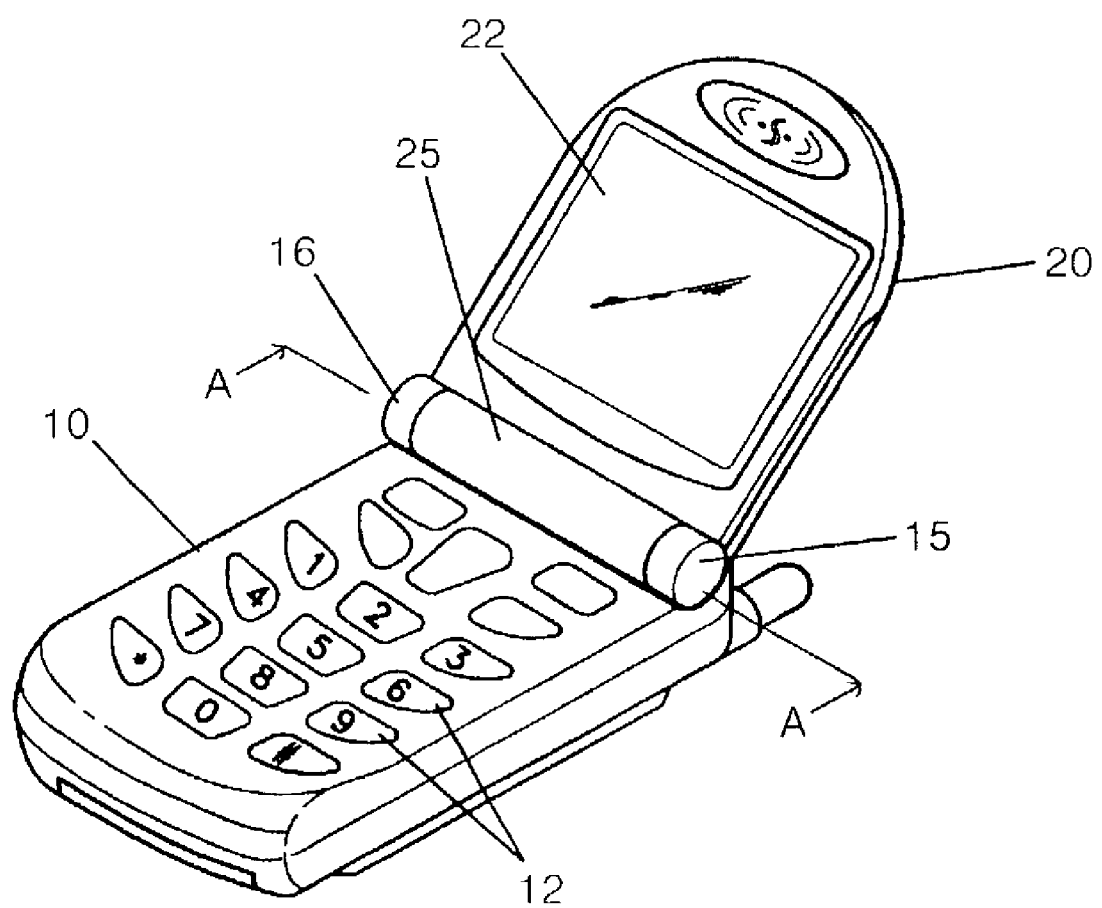
FIG. 1 is a perspective view illustrating a folder type portable device.
Figure 2:
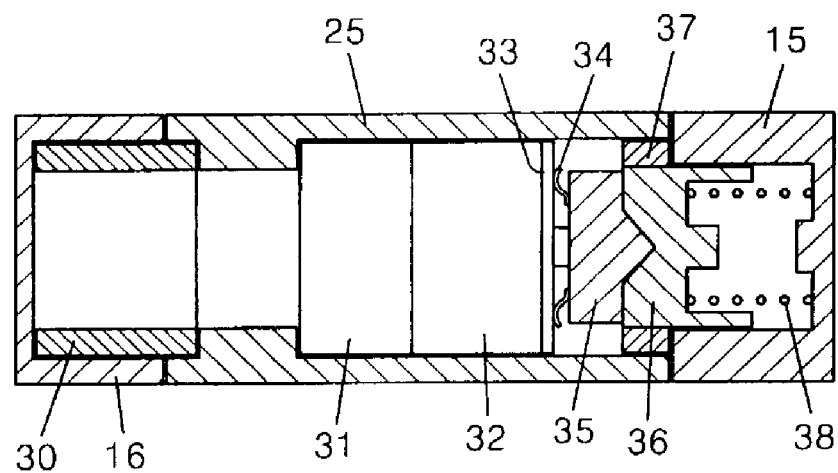
FIG. 2 is a cross-sectional view taken along the line A—A of FIG. 1, illustrating the conventional folder driving device for a portable device.
Figure 3:
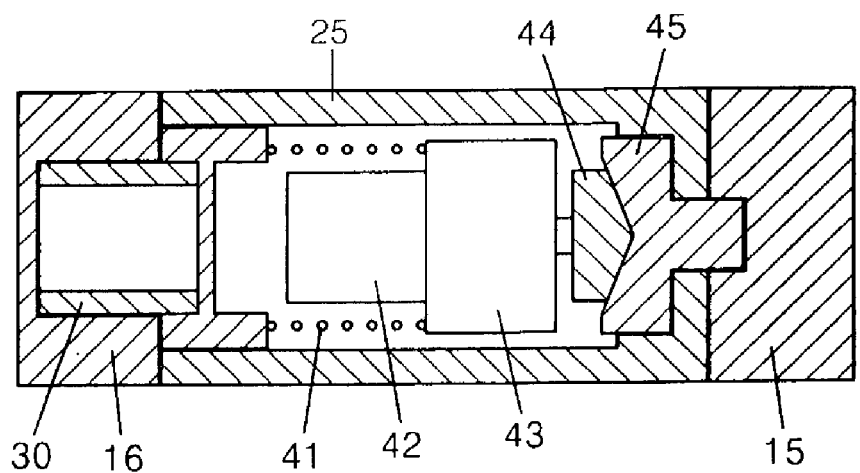
FIG. 3 is a cross-sectional view illustrating another conventional folder driving device for a portable device.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 4:
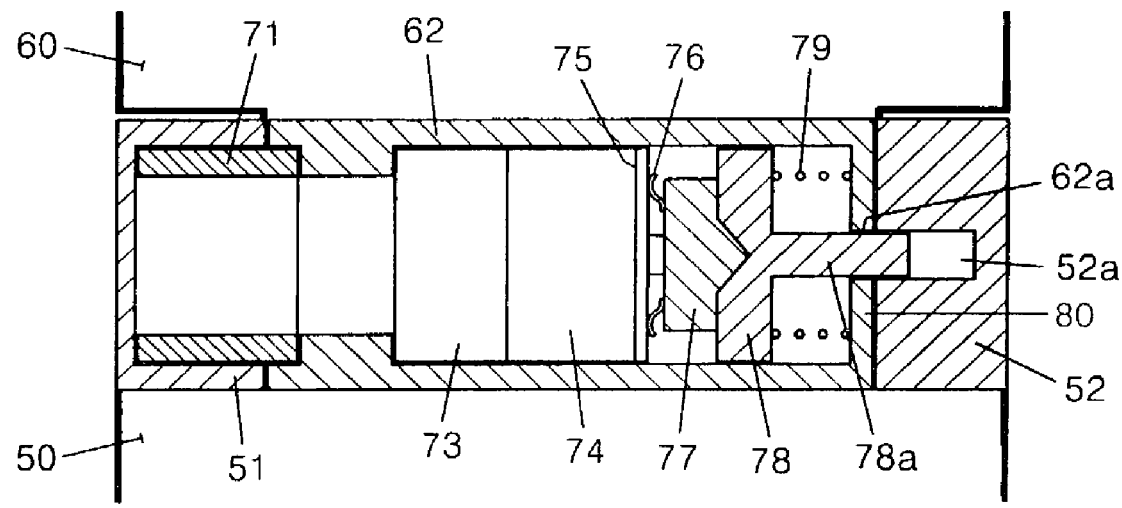
FIG. 4 is a cross-sectional view illustrating a folder driving device for a portable device in accordance with a first embodiment of the present invention.

FIG. 4 is a cross-sectional view illustrating a folder driving device for a portable device in accordance with a first embodiment of the present invention.

The folder driving device according to the first embodiment of the present invention comprises first and second shaft support parts 51 and 52, a cylindrical hinge housing 62, a cylindrical hinge connector 71, a pair of cam couplers 77 and 78, driving means 73 and. 74, and an elastic member 79. The first and second shaft support parts 51 and 52 are formed at one end of a body element 50 of the portable device, wherein the first and second shaft support parts are spaced apart from each other by a predetermined distance and opened at their respective ends facing to each other. The cylindrical hinge housing 62 is connected to a folder 60 of the portable device, wherein the cylindrical hinge housing is positioned between the first and second shaft support parts 51 and 52 and opened at both ends thereof. The cylindrical hinge connector 71 functions to rotatably connect the first shaft support part 51 and the hinge housing 62 with each other. The pair of cam couplers 77 and 78 are coupled to the second shaft support part 52 in the hinge housing 62 in a manner such that one cam coupler 78 is prevented from being rotated and is allowed to be moved in an axial direction and the other cam coupler 77 functions to determine folder opening and closing positions. The driving means 73 and 74 are disposed in the hinge housing 62 and function to provide driving force to the other cam coupler 77 to allow the folder 60 to be automatically opened and closed. The elastic member 79 is placed between one cam coupler 78 and the hinge housing 62 to provide elastic force and cause the cam couplers 77 and 78 to be brought into close contact with each other to thereby be moved in the axial direction.

The cam couplers comprise a hinge cam 78 and a hinge shaft 77. The hinge cam 78 is coupled to the second shaft support part 52 in the hinge housing 62 in a manner such that it is prevented from being rotated and allowed to be moved in an axial direction. The hinge shaft 77 is placed in the hinge housing 62 and cooperates with the hinge cam 78 to determine folder opening and closing positions.

The hinge shaft 77 is formed at a middle portion thereof with a projection having a triangular cross-sectional shape, and the hinge cam 78 is defined with a groove having also a triangular cross-sectional shape.

Due to the fact that the hinge shaft 77 and the hinge cam 78 constituting the cam couplers receive elastic support force of the elastic member 79, if driving force of the driving means 73 and 74 is transmitted to the hinge shaft 77, the hinge shaft 77 and the hinge cam 78 are engaged to each other to form a single body. In the case that the folder 60 is manually opened and closed or external force is applied to the folder 60 while the folder 60 is automatically opened or closed, the hinge shaft 77 and the hinge cam 78 are separated from each other.

The hinge cam 78 is integrally and projectedly formed, at its one axial end surface, with an elongate rod portion 78a to be coupled into the second shaft support part 52. Of course, the second shaft support part 52 has a coupling groove 52a which is defined in such a way as to allow axial movement of and prevent rotation of the elongate rod portion 78a inserted therein. A spring support portion 80 for supporting the elastic member 79 is formed at an end of the hinge housing 62 which faces the second shaft support part 52. The spring support portion 80 is defined, at a center thereof, with a hole 62a through which the elongate rod portion 78a of the hinge cam 78 passes.

The elastic member 79 is made of material having excellent elastic strain and returning force and generally comprises the conventional coil spring.

The driving means are installed in the cylindrical hinge housing 62 and function to generate driving force for rotating the folder 60. The driving means comprise a motor 73 serving as a power generator for generating rotation force, and a reducer 74 for reducing a rotation speed of the motor 73 as desired and transmitting a reduced rotation speed to the hinge shaft 77.

Here, the motor 73 is connected to a signal applying section which is provided at a side of the body element 50. In response to manipulation of the signal applying section, the motor 73 receives power from a battery pack mounted to the portable device according to the conventional art and is rotated in forward or backward directions to generate rotation force. The reducer 74 is arranged at an output end of the motor 73. The reducer 74 functions to reduce a rotation speed of the motor 73 to a predetermined rate and comprises a plurality of planetary gear groups. The planetary gear groups accomplish a predetermined reduction ratio and simultaneously perform functions of reducing a rotation speed and preventing reverse rotation.

While it can be envisaged that the driving means comprise the conventional micro motor 73 and the reducer 74, driving means having a variety of configurations may be used so long as they have structural features capable of stably generating driving force for driving the folder 60 and simultaneously performing the reverse rotation-preventing function.

Meanwhile, position sensing means for sensing a rotated position of the folder 60 is provided between the reducer 74 and the hinge shaft 77. The position sensing means is configured to control the motor 73 in a manner such that a phase difference is corrected by 30° with respect to a range between 0° and 150° through which the folder 60 is opened and closed. The position sensing means comprises a sensing plate 75 installed on the reducer 74, and a sensing contactor 76 installed on the hinge shaft 77 at a position facing the sensing plate 75. As the sensing plate 75 and the sensing contactor 76 are brought into contact with each other, an electrical signal is outputted.

Hereafter, operations of the folder driving device for a portable device according to the present invention, constructed as mentioned above, will be described.

If a user rotates the folder 60 forward or backward to manually open or close the folder 60, the hinge housing 62 is also integrally rotated forward or backward. At this time, since rotation force applied to the folder 60 is larger than elastic support force rendered by the elastic member 79, the hinge cam 78 is moved in the axial direction along with the hinge shaft 77 while being slipped on the hinge shaft 77.

If the user manipulates the signal applying section to automatically open the folder 60, due to the fact that the hinge shaft 77 and the hinge cam 78 are engaged with each other, a body of the motor 73 is rotated about its axis. By this fact, as the folder 60 having the hinge housing 62 in which the motor 73 is installed is also rotated for a predetermined period of time, the folder 60 is opened from the body element 50 of the portable device. If the user re-manipulates the signal applying section to automatically close the folder 60, as the motor 73 is rotated in a reverse direction, the folder 60 is also rotated in the reverse direction to be closed.

Figure 5:
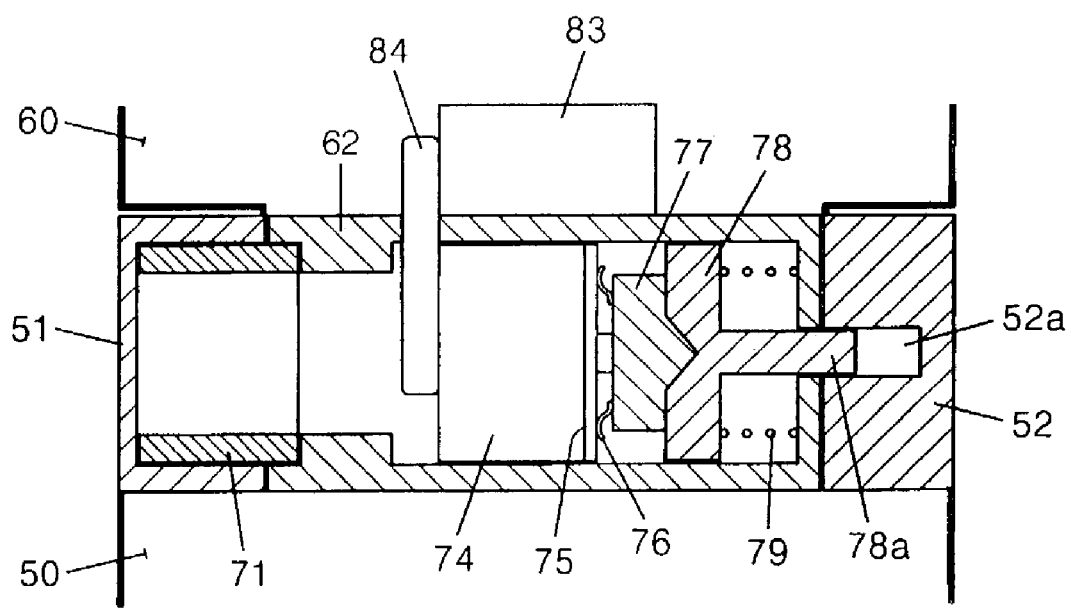
FIG. 5 is a cross-sectional view illustrating a folder driving device for a portable device in accordance with a second embodiment of the present invention.

FIG. 5 is a cross-sectional view illustrating a folder driving device for a portable device in accordance with a second embodiment of the present invention. As for the same component parts as in the first embodiment, the same reference numerals will be used and detailed description thereof will be omitted.

While it was illustrated in the first embodiment that the motor is installed in the hinge housing, in this second embodiment of the present invention, a motor 83 is mounted in the folder 60, and a reducer 74 is positioned in the hinge housing 62 to receive rotation force from the motor 83 through power transmission means 84.

Here, the power transmission means 84 may comprise a pair of gear sets, a pulley and belt assembly, etc., as in the conventional art.

Due to the fact that the motor 83 is installed not in the hinge housing 62 but in the folder 60, an inner structure of the hinge housing 62 can be simplified and a size of the motor 83 can be increased, whereby a torque of the motor 83 can be increased, and an entire length of the hinge housing 62 can be decreased.

As apparent from the above description, the folder driving device for a portable device according to the present invention provides advantages in that, since cam couplers and an elastic member for supporting the cam couplers are mounted in a hinge housing, assemblability and matchability of component parts are improved while not causing a decrease in torque outputted from a motor.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A folder driving device for a portable device, comprising:
   first and second shaft support parts formed at one end of a body element of the portable device, wherein said first and second shaft support parts are spaced apart from each other by a predetermined distance and opened at their respective ends facing to each other;
   a cylindrical hinge housing connected to a folder of the portable device, wherein said cylindrical hinge housing is positioned between the first and second shaft support parts and opened at both ends thereof;
   a hinge cam coupled to the second shaft support part in the hinge housing in a manner such that it is prevented from being rotated and allowed to be moved in an axial direction, the hinge cam is integrally and projectedly formed, at its one axial end surface, with an elongate rod portion coupled to the second shaft support part;
   a hinge shaft placed in the hinge housing and cooperating with the hinge cam to determine folder opening and closing positions;
   an elastic member placed between the hinge cam and the hinge housing to apply elastic force to the hinge cam for biasing the hinge cam against the hinge shaft; and
   driving means for transmitting rotation force to the hinge shaft.

2. The folder driving device as set forth in claim 1, wherein the second shaft support part has a coupling groove which is defined in such a way as to allow axial movement of and prevent rotation of the rod portion inserted therein.

3. The folder driving device as set forth in claim 1, wherein a spring support portion for supporting the elastic member is formed at an end of the hinge housing which faces the second shaft support part.

4. The folder driving device as set forth in claim 3, wherein the spring support portion is defined, at a center thereof, with a hole through which the hinge cam passes.

5. The folder driving device as set forth in claim 1, wherein the driving means comprises a motor for generating rotation force, and a reducer for reducing a rotation speed of the motor as desired and transmitting a reduced rotation speed to the hinge shaft.

6. The folder driving device as set forth in claim 5, wherein a sensor for sensing a position of the folder is arranged between a portion integrally connected with the reducer and the hinge shaft.

7. The folder driving device as set forth in claim 5, wherein both of the motor and the reducer are positioned in the hinge housing.

8. The folder driving device as set forth in claim 5, wherein the motor is mounted in the folder, and the reducer is positioned in the hinge housing to receive rotation force from the motor via a power transmission arrangement.

9. A folder driving device for a portable device, comprising:
   first and second shaft support parts formed on a body element of the portable device;
   a hinge housing connected to a folder of the portable device and positioned between the first and second shaft support parts;
   a hinge connector adapted to connect one of the shaft support parts to the hinge housing to allow a relative rotation therebetween
   a pair of cam couplers coupled to the other one of the shaft support parts in the hinge housing in a manner such that one cam coupler is prevented from being rotated and is allowed to be moved in an axial direction and the other cam coupler functions to determine folder opening and closing positions, said at least one cam coupler is integrally and projectedly formed, at its one axial end surface, with an elongate rod portion to be coupled into the second shaft support part;
   driving means for providing driving force to the other cam coupler to allow the folder to be automatically opened and closed; and
   an elastic member placed between one cam coupler and the hinge housing to cause the cam couplers to be brought into close contact with each other to thereby be moved in the axial direction.

10. The folder driving device as set forth in claim 9, wherein the driving means comprises a power generator for generating rotation force, and a reducer mounted in the hinge housing and connected to the power generator to reduce a rotation speed of the power generator as desired.

11. The folder driving device as set forth in claim 10, wherein a sensor for sensing a position of the folder is arranged between a portion integrally connected with the reducer and the other cam coupler.

12. A folder driving device for a portable device, comprising:
   first and second shaft support parts formed at one end of a body element of the portable device, wherein said first and second shaft support parts are spaced apart from each other by a predetermined distance and opened at their respective ends facing to each other;
   a cylindrical hinge housing connected to a folder of the portable device, wherein said cylindrical hinge housing is positioned between the first and second shaft support parts and opened at both ends thereof;
   a pair of cam couplers respectively including a hinge cam which is coupled to the second shaft support part in a manner such that it is prevented from being rotated and is allowed to be moved in an axial direction and a hinge shaft which cooperates with the hinge cam to determine folder opening and closing positions, said hinge cam is integrally and projectedly formed, at its one axial end surface, with an elongate rod portion to be coupled into the second shaft support part;
   an elastic member for applying elastic force to the hinge cam to bring the hinge cam into close contact with the hinge shaft; and
   driving means including a power generator for generating rotation force, a reducer connected to the power generator to transmit rotation force to the hinge shaft and reduce a rotation speed of the power generator as desired, and a power transmission arrangement for connecting the power generator and the reducer.

* * * * *